I. S. SHEETS.
Ditching Plow.

No. 102,599.

Patented May 3, 1870.

Witnesses.

Inventor.

UNITED STATES PATENT OFFICE.

ISAAC S. SHEETS, OF TROY, OHIO.

IMPROVEMENT IN DITCHING-PLOWS.

Specification forming part of Letters Patent No. 102,599, dated May 3, 1870.

*To all whom it may concern:*

Be it known that I, ISAAC S. SHEETS, of Troy, in the county of Miami and State of Ohio, have invented a new and useful Improvement in Ditching-Plows; and I do hereby declare that the following is a full, clear, and exact description thereof, which will enable others skilled in the art to make and use the same, reference being had to the accompanying drawings, forming part of this specification, in which—

Figure 1:
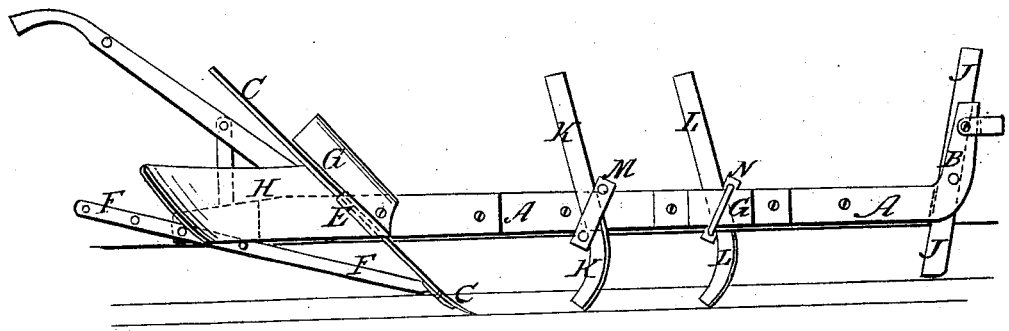
Figure 2:
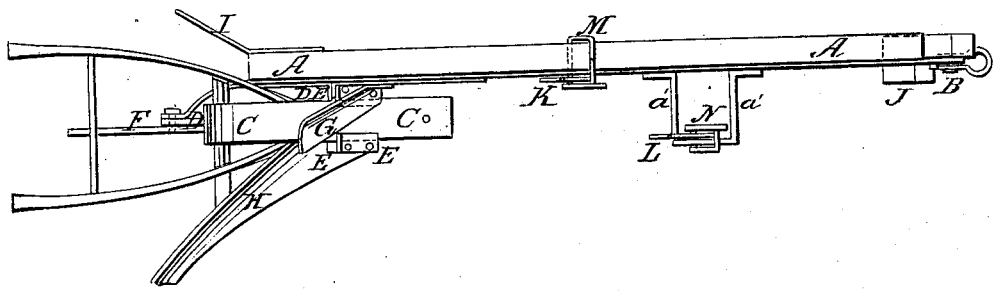

Figure 1 is a side view of my improved ditching-plow. Fig. 2 is a top view of the same.

Similar letters of reference indicate corresponding parts.

My invention has for its object to improve the construction of the ditching-plow patented by me February 16, 1869, so as to make it more simple in construction, more effective in operation, and more conveniently adjusted as the ditch increases in depth; and it consists in the construction and combination of various parts of the plow, as hereinafter more fully described.

A represents the plow-beam, to the right-hand or off side of the forward end of which is attached the draft-bar B. The beam A always slides along the surface of the ground, and its under side should be shod with iron, to prevent wear.

C is the plow-plate, which is secured to the plate D by the clamps E, so that it may be conveniently raised and lowered, as the depth of the ditch may require. The plate D is securely bolted to the right-hand or off side of the plow-beam, and may be cast in one piece, or made of wrought-iron, as may be desired or convenient. To the lower part of the plow-plate C is secured the lower end of the inclined brace-bar F, the upper part of which is securely bolted to the rear part of the plate or frame D, several holes being formed in the said brace-bar for the reception of the said bolt, so that the brace-bar F may be conveniently adjusted according to the required adjustment of the plow-plate C.

G is a mold-board or guide-plate, which is attached to the beam A and plate or frame D, either or both, in such a position as to guide the dirt raised by the plow to the side of the ditch, when it is pushed back from the edge of the ditch by the wing H, attached to the frame or plate D, in such a position as to move along the surface of the ground at the right-hand side of the ditch.

I is a wing attached to the left-hand side of the rear end of the plow-beam A, and which is designed to push back the dirt from the left-hand side of the ditch, so that the dirt may be kept pushed back, and the surface of the ground kept clear upon both sides of the ditch.

By this construction of the various parts of the plow, the forward end of the beam A will be directly over the ditch.

To the forward end of the beam A is attached or pivoted a drag or roller, J, which moves along the surface of the furrow or ditch, and which assists in guiding the plow and in gaging the depth of the cut or furrow. The drag or roller J should be arranged so that it may be adjusted to correspond with the adjustment of the plow-plate.

K and L are cutters, which are designed for cutting into the dirt at the sides of the ditch to the depth of the cut or furrow, so that the sides of the ditch may be made smooth and true, and so that the cut or slice may be raised more easily by the plow-plate C.

The rear cutter K is secured to the beam A by a clip and yoke, M, and the forward cutter L is secured to the bracket or frame a', attached to the right-hand side of the beam A, by a similar clip and yoke, N, so that the said cutters K L may be securely held, and at the same time held in such a way that they may be conveniently adjusted to correspond with the adjustment of the plow-plate C.

The cutters K L may be made circular, if desired.

In using the ditching-plow, the plow-plate C and cutters K L are adjusted according to the required depth of the first or opening furrow. The drag or roller J is then turned up out of the way, and the plow is ready for opening the first cut or furrow. The plow-plate C, cutters K L, and drag or roller J are then adjusted according to the required depth of the second cut, and the plow is again drawn through the ditch, and so on until the ditch has been opened to the required depth, the beam A always sliding along the surface of the ground, and thus gaging the depth of the cut or furrow.

Having thus described my invention, I claim as new and desire to secure by Letters Patent—

The combination of plow-plate C, guide-plate G, and wing H, when said parts are arranged on one side of the beam, and operated successively to raise the dirt from the furrow, guide it to the side of the ditch, and push it from the edge thereof, in the manner described.

ISAAC S. SHEETS.

Witnesses:
ROBT. H. CULBERTSON,
W. C. BUTLER.